United States Patent
Pikle et al.

(10) Patent No.: US 11,171,929 B2
(45) Date of Patent: Nov. 9, 2021

(54) APPLYING DIFFERENTIAL SECURITY TO API MESSAGE PAYLOAD DATA ELEMENTS

(71) Applicant: INTERNATIONAL BUSINESS MACHINES CORPORATION, Armonk, NY (US)

(72) Inventors: Anand Pikle, Pune (IN); Amol Dhondse, Kothrud (IN); Abhay Patra, Pune (IN); Harish Bharti, Pune (IN); Rajesh Kumar Saxena, Thane (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 16/222,567

(22) Filed: Dec. 17, 2018

(65) Prior Publication Data

US 2020/0195615 A1 Jun. 18, 2020

(51) Int. Cl.
*H04L 29/06* (2006.01)
*G06F 21/62* (2013.01)
(Continued)

(52) U.S. Cl.
CPC ............ *H04L 63/0414* (2013.01); *G06F 9/54* (2013.01); *G06F 21/62* (2013.01); *G06N 20/00* (2019.01)

(58) Field of Classification Search
CPC ... H04L 63/0414; H04L 63/105; G06F 21/62; G06F 21/6209; G06F 9/54; G06F 9/546; G06N 20/00; G06N 3/084; G06N 3/0445
See application file for complete search history.

(56) References Cited

U.S. PATENT DOCUMENTS 8,286,237 B2 10/2012 Moghe
2004/0078595 A1* 4/2004 Kent, Jr. ............ H04L 63/0428
713/160
(Continued)

FOREIGN PATENT DOCUMENTS

EP 3001402 A1 9/2014
WO 2016168368 A1 10/2016

OTHER PUBLICATIONS

"Understanding and Selecting Data Masking Solutions: Creating Secure and Useful Data," [online] Securosis, LLC, Ver. 1.0, released Aug. 10, 2012, retrieved from the Internet: <https://securosis.com/assets/library/reports/UnderstandingMasking_FinalMaster_V3.pdf>, 33 pg.

(Continued)

*Primary Examiner* — Robert B Leung
(74) *Attorney, Agent, or Firm* — Cuenot, Forsythe & Kim, LLC

(57) ABSTRACT

A computer system message generated by an application programming interface (API) or addressed to the API can be received. A first data sensitivity score for at least a first of a plurality of data elements in a payload of the computer system message and at least second data sensitivity score for at least a second of the plurality of data elements in the payload of the computer system message can be determined. Based on the first data sensitivity score and at least the second data sensitivity score, a differential security can be applied to the computer system message. Applying the differential security can include masking the first of the plurality of data elements and not masking the second of the plurality of data elements. The computer system message can be electronically communicated the to a destination to which the message is addressed.

17 Claims, 7 Drawing Sheets

(51) Int. Cl.
*G06F 9/54* (2006.01)
*G06N 20/00* (2019.01)

(56) References Cited

U.S. PATENT DOCUMENTS

| | | | |
|---|---|---|---|
| 2005/0223412 A1* | 10/2005 | Nadalin | H04L 63/126 726/3 |
| 2007/0101123 A1* | 5/2007 | Kollmyer | H04L 9/065 713/154 |
| 2007/0282783 A1* | 12/2007 | Singh | G06F 16/40 |
| 2008/0181396 A1 | 7/2008 | Balakrishnan et al. | |
| 2012/0110680 A1* | 5/2012 | Oliver | G06F 21/6245 726/30 |
| 2014/0149322 A1 | 5/2014 | Lavoie et al. | |
| 2015/0186664 A1* | 7/2015 | Nicolaou | G06F 21/6281 726/30 |
| 2015/0324593 A1* | 11/2015 | Abuelsaad | H04L 63/166 713/152 |
| 2016/0072835 A1* | 3/2016 | Roytman | H04L 63/1433 726/25 |
| 2016/0098576 A1 | 4/2016 | Allen et al. | |
| 2017/0093810 A1 | 3/2017 | Verma | |
| 2017/0104756 A1 | 4/2017 | Rosenthal et al. | |
| 2017/0118221 A1* | 4/2017 | Hannel | H04L 63/0471 |
| 2017/0126739 A1 | 5/2017 | Abuelsaad et al. | |

OTHER PUBLICATIONS

Ikawa, Y. et al., "A New Document Masking Approach for Removing Confidential Information." In the 9th IEEE Int'l. Conf. on E-Commerce Technology and the 4th IEEE Int'l. Conf. on Enterprise Computing, E-Commerce, and E-Services, CEC/EEE, 2007, pp. 107-114 [Abstract Only].

Edgar, D., "Data Sanitization Techniques," [online] Net 2000 Ltd. © 2003-2004, retrieved from the Internet: <http://www.orafaq.com/papers/data_sanitization.pdf>, 8 pg.

Kumar, A., "Data obfuscation techniques: Best practices and design approached," [online] TechTarget © 2000-2018, retrieved Dec. 16, 2018, retrieved from the Internet: <http://go.techtarget.com/r/81178275/21368419>, 2 pg.

Joseph, A.D. et al., "Machine learning methods for computer security (Dagstuhl Perspectives Workshop 12371)," In Dagstuhl Manifestos, vol. 3, No. 1. Schloss Dagstuhl-Leibniz-Zentrum fuer Informatik, 2013, 30 pg.

* cited by examiner

700

```
┌─────────────────────────────────────────────────┐
│ Receive a computer system message generated by  │
│ an API or addressed to the API                  │
│ 702                                             │
└─────────────────────────────────────────────────┘
                        ↓
┌─────────────────────────────────────────────────┐
│ Determine contextual information that pertains  │
│ to data elements contained in a payload of the  │
│ message                                         │
│ 704                                             │
└─────────────────────────────────────────────────┘
                        ↓
┌─────────────────────────────────────────────────┐
│ Determine respective data sensitivity scores    │
│ for the data elements                           │
│ 706                                             │
└─────────────────────────────────────────────────┘
                        ↓
┌─────────────────────────────────────────────────┐
│ Determine whether the data sensitivity scores   │
│ determined for the data elements warrant        │
│ masking of any of the data elements             │
│ 708                                             │
└─────────────────────────────────────────────────┘
                        ↓
                 ╱ Masking  ╲   Yes
                ╱ warranted? ╲───────→
                ╲    710     ╱
                 ╲          ╱
                       ↓ No
┌─────────────────────────────────────────────────┐
│ Send the message to the intended recipient      │
│ without masking any data elements.              │
│ 712                                             │
└─────────────────────────────────────────────────┘
                        ↓
┌─────────────────────────────────────────────────┐
│ Based on the data sensitivity scores, apply a   │
│ differential security to apply to the message   │
│ 714                                             │
└─────────────────────────────────────────────────┘
                        ↓
┌─────────────────────────────────────────────────┐
│ Electronically communicate the computer system  │
│ message to a destination to which the message   │
│ is addressed                                    │
│ 716                                             │
└─────────────────────────────────────────────────┘
```

FIG. 7

APPLYING DIFFERENTIAL SECURITY TO API MESSAGE PAYLOAD DATA ELEMENTS

BACKGROUND

The present invention relates to cloud computing, and more specifically, to data security in cloud computing environments.

Enterprises are moving towards processing large amounts of data, including insights derived from data analytics, in cloud computing environments. In some cloud computing environments, applications, partners and customers may be integrated into a single, interconnected system. In such a system, data may be exchanged across various data processing systems and in various dimensions, such as time, category, entity type, etc.

SUMMARY

A method includes receiving a computer system message generated by an application programming interface (API) or addressed to the API. The method also can include determining a first data sensitivity score for at least a first of a plurality of data elements in a payload of the computer system message and determining at least second data sensitivity score for at least a second of the plurality of data elements in the payload of the computer system message. The method also can include, based on the first data sensitivity score and at least the second data sensitivity score, applying, using a processor, a differential security to the computer system message, applying the differential security including masking the first of the plurality of data elements and not masking the second of the plurality of data elements. The method also can include electronically communicating the computer system message to a destination to which the message is addressed.

A system includes a processor programmed to initiate executable operations. The executable operations include receiving a computer system message generated by an application programming interface (API) or addressed to the API. The executable operations also can include determining a first data sensitivity score for at least a first of a plurality of data elements in a payload of the computer system message and determining at least second data sensitivity score for at least a second of the plurality of data elements in the payload of the computer system message. The executable operations also can include, based on the first data sensitivity score and at least the second data sensitivity score, applying a differential security to the computer system message, applying the differential security including masking the first of the plurality of data elements and not masking the second of the plurality of data elements. The executable operations also can include electronically communicating the computer system message to a destination to which the message is addressed.

A computer program product includes a computer readable storage medium having program code stored thereon. The program code is executable by a data processing system to initiate operations. The operations include receiving a computer system message generated by an application programming interface (API) or addressed to the API. The operations also can include determining a first data sensitivity score for at least a first of a plurality of data elements in a payload of the computer system message and determining at least second data sensitivity score for at least a second of the plurality of data elements in the payload of the computer system message. The operations also can include, based on the first data sensitivity score and at least the second data sensitivity score, applying a differential security to the computer system message, applying the differential security including masking the first of the plurality of data elements and not masking the second of the plurality of data elements. The operations also can include electronically communicating the computer system message to a destination to which the message is addressed.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 7 is a flowchart illustrating an example of a method of applying differential security to a computer system message.

DETAILED DESCRIPTION

Figure 1:
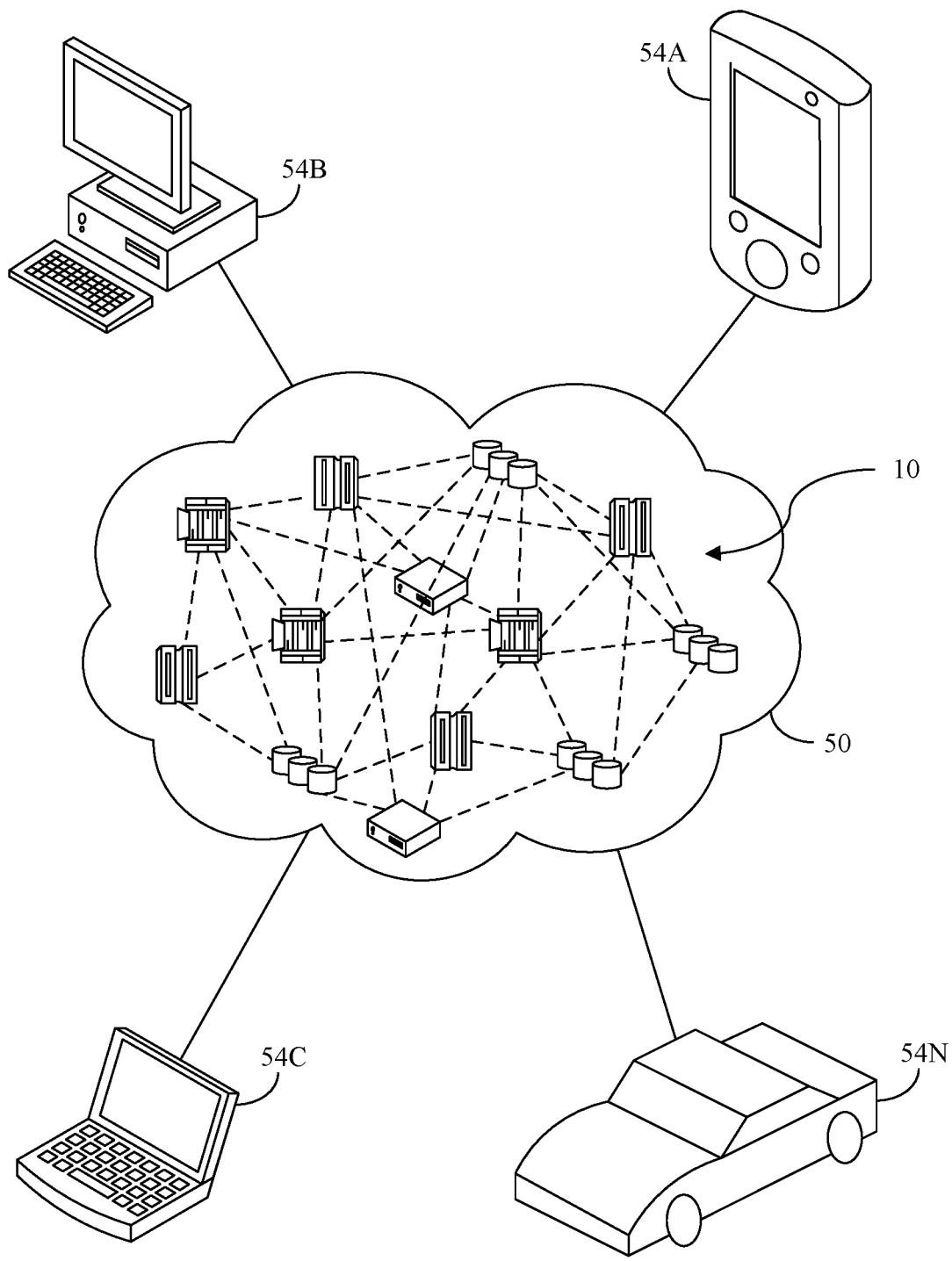
FIG. 1 depicts a cloud computing environment according to an embodiment of the present invention.

This disclosure relates to cloud computing, and more specifically, to data security in cloud computing environments. In accordance with the inventive arrangements disclosed herein, differential security can be applied to data elements within a payload of an application programming interface (API) message. The differential security can be applied by using learning classification techniques to dynamically rate data elements with regard to sensitivity (e.g., confidentiality) based on contextual parameters. The contextual parameters can indicate, for example, a data source, a content category, an entity type, etc.

Applying the differential security can include selectively masking (e.g., obfuscating, encoding and/or encrypting) data elements within the payload of the API message. For example, a contextual data sensitivity score can be derived for individual and/or composite data elements in the payload, and data elements for which the contextual data sensitivity score exceeds a threshold value can be masked.

Further, in contrast to traditional ways of authoring data security policies then deploying policies, data security policies can be dynamically created and employed, for example in the form of data masking models. The data security policies can be enforced based on data security principles and context-based data classification, and can adapt over time to changing security and/or other contextual conditions. For example, additional data security policies can be implemented to identify if a data value for an attribute of a data element is not aligned to its data classification.

Several definitions that apply throughout this document now will be presented.

As defined herein, the term "payload" means data electronically transmitted in a message that is distinct from a message header that is used to enable delivery of the message. Examples of a message include a request message and a response message.

As defined herein, the term "application programming interface payload" means a payload of a message communicated to an application programming interface or a payload of a message generated by an application programming interface.

As defined herein, the term "computer system message" means a request message or a response message passed between computer programs. As the term "computer system message" is defined herein, an instant message, a text message, an electronic mail (email), a post to a web forum or social media system, and the like are not computer system messages.

As defined herein, the term "differential security" means a data security comprising a plurality of security levels, wherein a first level of security is configured to be applied to a first portion of data and at least a second level of security is configured to be applied to at least a second portion of the data.

As defined herein, the term "data sensitivity" means an indication of an adverse effect resulting from access to data by one or more unauthorized parties.

As defined herein, the term "mask" means to obfuscate, encrypt and/or encode at least one data element.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "data masking model" means a functional data structure that defines a data security policy for determining a level of data sensitivity of data elements in a payload of a computer system message generated by, or addressed to, an application programming interface.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
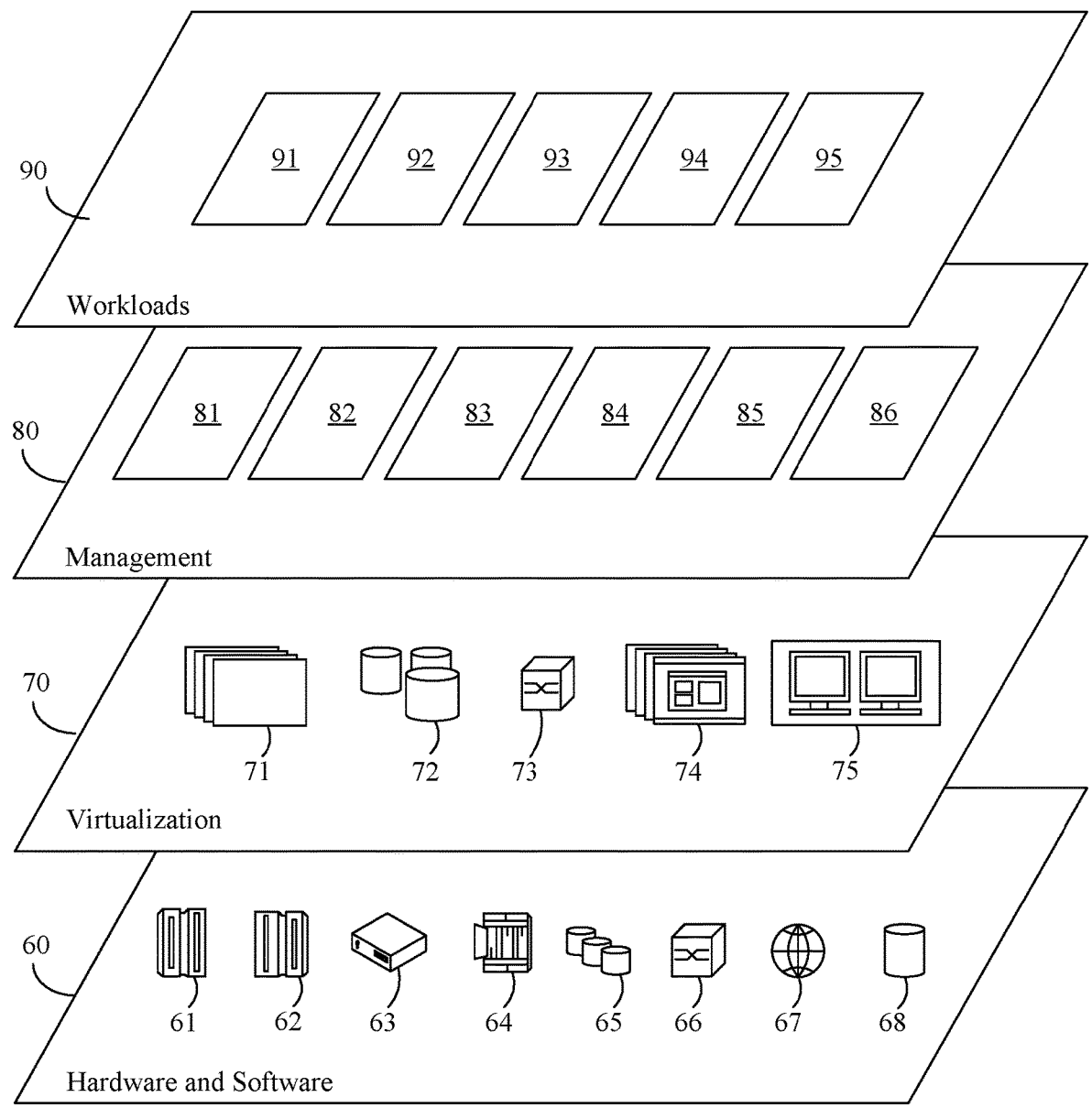
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Security 86 provides identity verification for cloud consumers and tasks, as well as protection for data and other resources.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94 and transaction processing 95.

Figure 3:
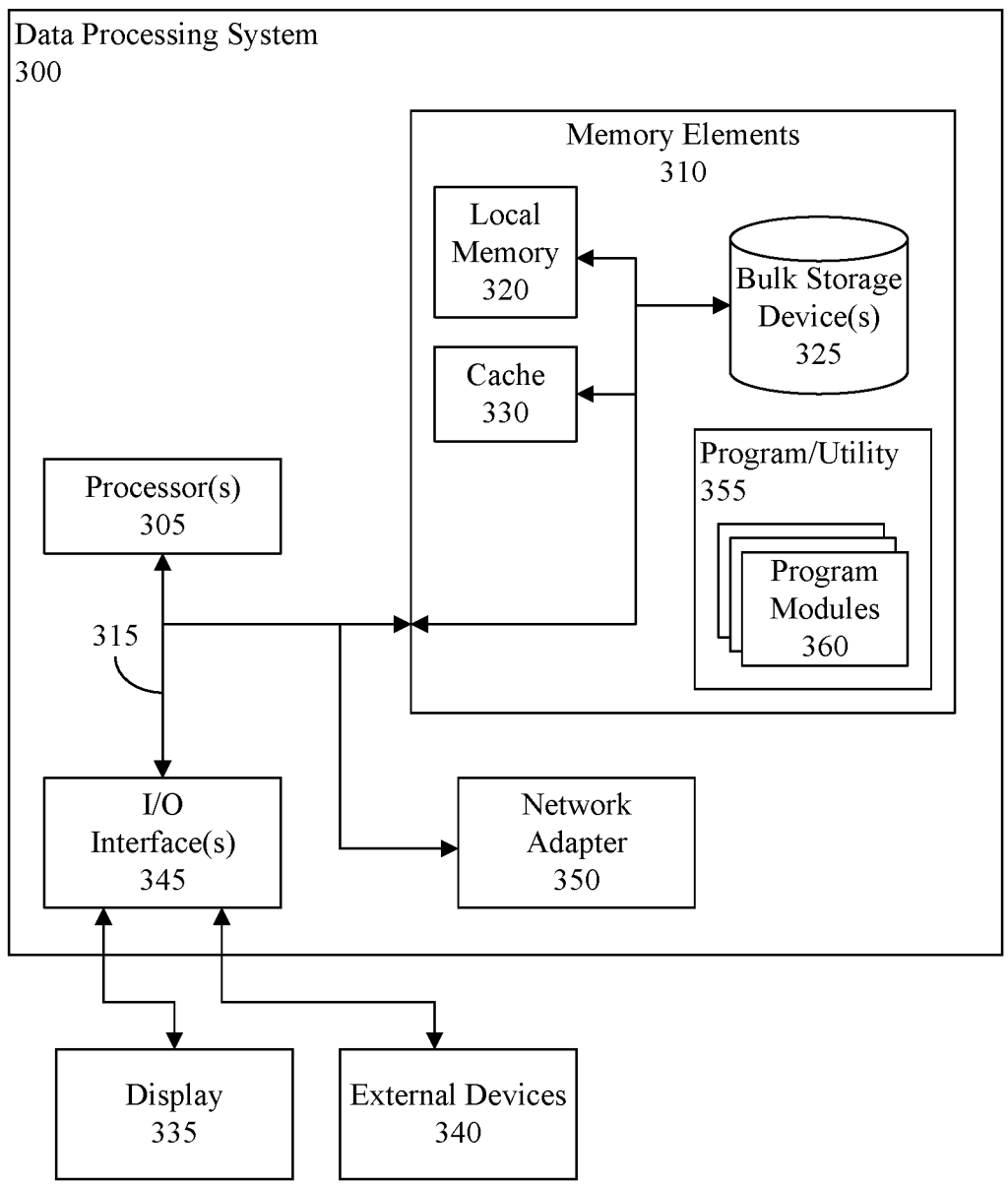
FIG. 3 is a block diagram illustrating example hardware architecture for a data processing system.

FIG. 3 is a block diagram illustrating example hardware architecture for a data processing system 300, which can be implemented on the hardware and software layer 60 of the cloud computing environment 50. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories 330 that provide temporary storage of at least some program code in order to reduce the number of times program code must be retrieved from the bulk storage device 325 during execution.

Input/output (I/O) devices such as a display 335 and, optionally, one or more other external devices 340 (e.g., a keyboard, mouse, etc.) can be coupled to the data processing system 300. The I/O devices can be coupled to the data processing system 300 either directly or through intervening I/O interfaces 345. One or more network adapters 350 also can be coupled to data processing system 300 to enable the data processing system 300 to become coupled to other systems, computer systems, remote printers, and/or remote storage devices through intervening private or public networks. Modems, cable modems, transceivers, and Ethernet cards, Ethernet modules are examples of different types of network adapters 350 that can be used with the data processing system 300.

As pictured in FIG. 3, the memory elements 310 can store the components of the data processing system 300, for example at least one program/utility 355 including one or more program modules 360. Being implemented in the form of executable program code, these components of the data processing system 300 can be executed by the data processing system 300 and, as such, can be considered part of the data processing system 300. Moreover, the program/utility 355 is a functional data structure that imparts functionality when employed as part of the data processing system 300.

Figure 4:
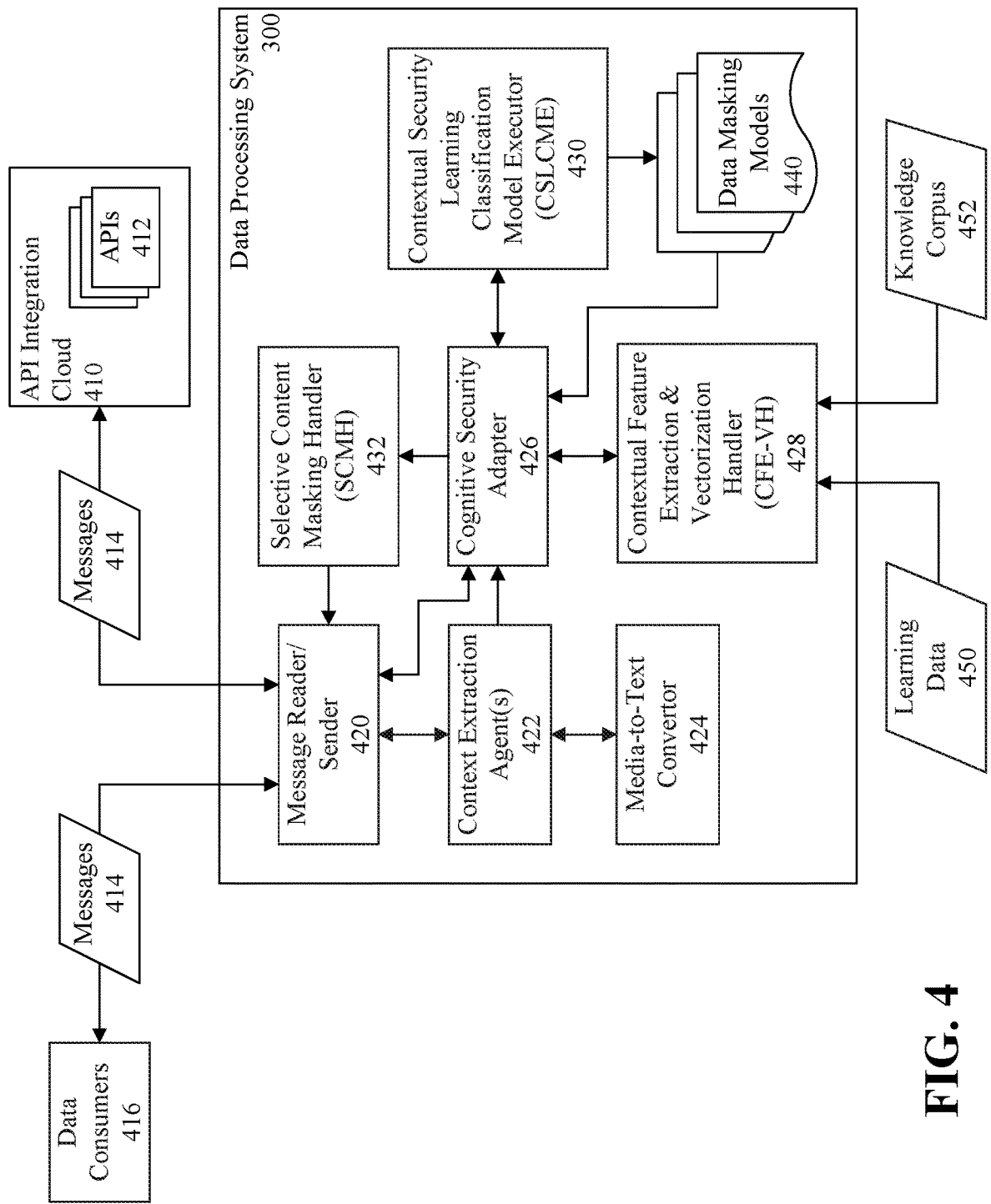
FIG. 4 is a block diagram illustrating example software architecture for a data processing system.

FIG. 4 is a block diagram illustrating example software architecture for the data processing system 300 of FIG. 3. The software architecture 400 can be implemented on the management layer 80 of the cloud computing environment 50, for example as part of security 86.

The data processing system (hereinafter "system") 300 can be communicatively linked to an application programming interface (API) integration cloud 410. The API integration cloud 410 can include a plurality of APIs 412. The system 300 can receive, from the API integration cloud 410, computer system messages (hereinafter "messages") 414 exchanged between data consumer computer systems (hereinafter "data consumers") 416 and the APIs 412. A message 414 can be a request message or response message generated an API 412 and communicated to a data consumer 416 and/or a request message or response message communicated from a data consumer 416 to an API 412. Each message 414 can include a payload comprising a plurality of data elements selected by, or communicated to, a respective API 412.

The system 300 can include various component such as, for example, a message reader/sender 420, one or more context extraction agents 422, a media-to-text converter 424, a cognitive security adapter 426, a contextual feature extraction and vectorization handler (CFE-VH) 428, a contextual security learning classification model executer (CSLCME) 430 and a selective content masking handler (SCMH) 432. The components 420-432 can be program modules 360 of the program/utility 355 of FIG. 3 and can be executed by the processor(s) 305 of FIG. 3.

Figure 5:
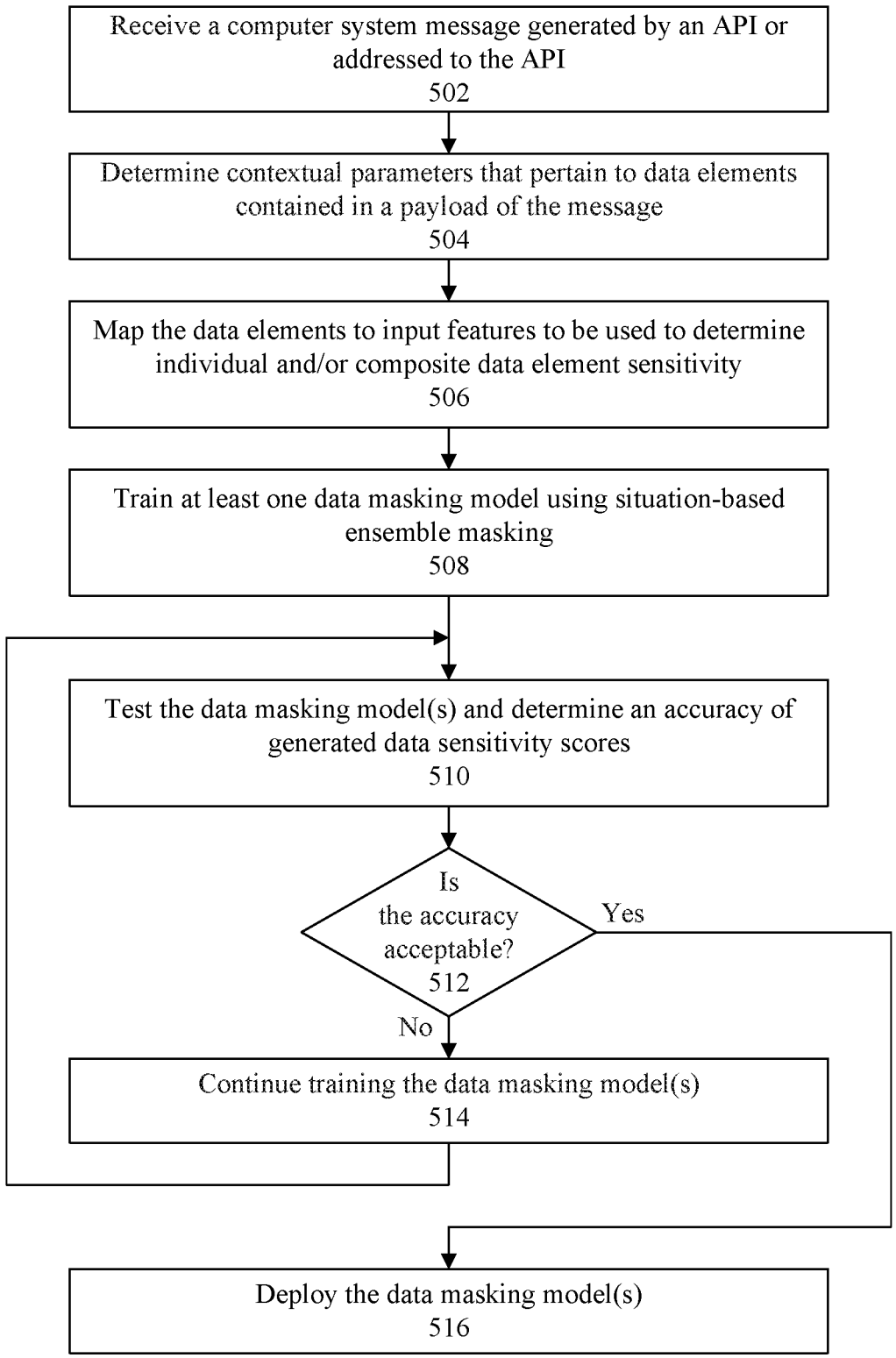
FIG. 5 is a flowchart illustrating an example of a method of deploying a data masking model for use in applying differential security to a computer system message.

FIG. 5 is a flowchart illustrating an example of a method 500 of deploying a data masking model 440 for use in applying differential security to a computer system message. The method 500 can be implemented by the system 300 of FIGS. 3 and 4. In the following description, elements of FIG. 4 will be referenced.

At step 502, the message reader/sender 420 can receive a computer system message (hereinafter "message") 414 generated by an API 412 or addressed to the API 412. In this example, the message 414 can be a training message generated by a computer system posing as a data consumer 416 and the message 414 can be configured to be used to train a data masking model 440. The present arrangements are not limited in this regard, however, and a message 414 exchanged between actual data consumers 416 and an API 412 can be used for training purposes. To receive the message 414, the message reader/sender 420 can intercept the 414, or the message 414 can be routed through the system 300. The context extraction agent(s) 422 can monitor messages 414 received by the message reader/sender 420 and detect the message 414 being received, or the message reader/sender 420 can communicate the message 414 to the context extraction agent(s) 422, in real time, in response to receiving the message 414.

At step 504, the context extraction agent(s) 422 can identify, in real time, contextual information (e.g., contextual parameters) that pertain to the data elements contained in a payload of the message 414. In illustration, the context extraction agent(s) 422 can identify contextual parameters that pertain to a first of the plurality of data elements, identify contextual parameters that pertain to a second of the plurality of data elements, and so on. Moreover, the context extraction agent(s) 422 can identify contextual parameters that pertain to a group of one or more data elements (e.g., a composite of data elements) contained in the payload of the message 414.

Examples of contextual parameters include, but are not limited to, use case parameters, business process specific parameters, parameters pertaining to weather, parameters pertaining to a security situation that may be evolving over time, parameters pertaining to traffic patterns, geo location parameters, parameters indicating data sources, parameters indicating content and/or data element categories, parameters indicating entities and/or entity types, and so on. In a non-limiting arrangement, the context extraction agent(s) 422 can call one or more third party APIs (e.g., APIs 412) to obtain the contextual parameters. For instance, the context extraction agent(s) 422 can analyze data elements contained in the payload of the message 414 and, based on such analysis, determine a type of contextual information that will be relevant to the data elements and call the appropriate API to obtain contextual parameters that are that type of contextual information.

Further, in the case that the payload of the message 414 includes media (e.g., audio, one or more still images and/or video), the context extraction agent(s) 422 can interface with the media-to-text converter 424 to extract contextual parameters contained in media. In illustration, at the behest of the context extraction agent(s) 422, the media-to-text converter 424 can perform, in real time, speech recognition on an audio portion of the media to convert spoken utterances to text, perform optical character recognition (OCR) on one or more images/video contained in the media to generate corresponding text and/or perform image recognition on one or more images/video contained in the media. The media-to-text converter 424 can communicate information resulting from such processing to the context extraction agent(s) 422 as additional contextual parameters. The context extraction agent(s) 422 can determine data elements and/or data element composites to which those contextual parameters pertain, if any, by analyzing the contextual parameters with respect to parameter values of the respective data elements.

The content extraction agent(s) 422 can communicate, in real time, to the cognitive security adapter 426 the contextual parameters. This can serve to initiate the cognitive security adapter 426 to begin processing the information for training of one or more data masking models 440, as will be described, using the message 414. By way of example, the cognitive security adapter 426 can be set to be in model training mode, or the cognitive security adapter 426 can identify a parameter, such as a flag, in the message 414 indicating that the message 414 is a training message.

At step 506, the cognitive security adapter 426 can map, for example as vectors, the data elements contained in the payload of the message 414, the contextual parameters (e.g., the contextual parameters provided by the third party APIs 412 and/or identified in the media) to input features to be used in a data masking model 440 to determine individual and/or composite data element sensitivity. For example, the cognitive security adapter 426 can access from the CFE-VH 428 data relevant to data element sensitivity. The cognitive security adapter 426 can use that data to determine the sensitivity of individual and/or composite data elements contained in the payload of the message 414. In illustration, the CFE-VH 428 can receive learning data 450 and knowledge corpus 452 from various sources, and process the learning data 450 and knowledge corpus 452 to learn and derive data relevant to data element sensitivity, for example using artificial intelligence deep learning. Based on the derived data, the CFE-VH 428 can determine the input features for the data masking model 440. The learning data 450 can include, for example, organizational/case specific inputs, user/organizational feedback, organizational input, information pertaining to roles, responsibilities, organization charts, trade secrets, business conduct guidelines, etc. The knowledge corpus can include, for example confidentiality policies, confidentiality regulations, and so on.

The process of mapping the data elements, contextual parameters and parameters identified in the media to the input features, the cognitive security adapter 426 can code the data elements and parameters as a bit stream with a set of artificial neurons of a neural network so that they may be masked based on contextual sensitivity. Each neuron can be included in several ensembles. Each situation and its corresponding maneuver can be presented as an ensemble.

At step 508, the CSLCME 430 can train at least one data masking model 440 using situation-based ensemble masking. In illustration, the situation-based ensemble masking can include, using the previously described mapping (e.g., vectors), determining a sensitivity rating, such as a data sensitivity score, for each of the data elements extracted from the payload of the message 414 based on the contextual parameters, additional parameters identified in the media and/or other available parameters. Examples of such parameters include, but are not limited to, content category, entity type, time, source, etc. A data sensitivity score assigned to a data element can vary over time, for example based on a role and relationship of an entity to which the data element pertains (e.g., a consumer) to an entity to whom the data element is being passed in the payload. The CSLCME 430 can train the data masking model(s) 440, using a machine learning process, to apply the determined sensitivity ratings to the data elements. The training can include, for example, applying connection weights to various neurons of the neural network. The connection weights can be mathematical models that apply to input parameters of a data masking model 440 and can be tuned to until they reach a stable state when predicting outputs.

At step 510, the cognitive security adapter 426 can test the data masking model(s) 440 and determine an accuracy of data sensitivity scores generated by the data masking model(s) 440. For example, the cognitive security adapter 426 can initiate a validation cycle to determine data masking models 440 that are most suitable for the data elements of the payload based on the present situation indicated by the contextual parameters and/or other parameters. During the validation cycle the data masking model(s) 440 can generate data sensitivity scores, which the cognitive security adapter 426 can compare to the data element sensitivity determined at step 506 to determine an accuracy of the generated data sensitivity scores.

Referring to decision box 512, if the accuracy is not acceptable, the process can proceed to step 514. At step 514 the CSLCME 430 can continue training the data masking model(s) 440. By way of example, the CSLCME 430 can apply back-propagation, which is known in the art of machine learning, to fine tune connection weights that result in activation of specific outputs. In a non-limiting arrangement, a user, such as a subject matter expert, further may review the data masking model(s) 440 and the data sensitivity scores generated by the data masking model(s) 440. Based on such review, the user can update the data masking model(s) 440, for example by adjusting the data sensitivity scores generated by the data masking models for various types of data elements based on the applicable contextual information. The user also may update the learning data 450 and/or knowledge corpus 452, which can serve to improve future data masking model 440 training. The process can return to step 510 and iteratively repeat until the accuracy of the data masking model(s) 440 is acceptable.

Responsive to determining that the data masking model(s) 440 are acceptable, at step 516, once the cognitive security adapter 426 can automatically deploy the data masking model(s) 440. When deployed, the data masking model(s) 440 can be used to determine a level of sensitivity of data elements contained in payloads of messages 414, for example by assigning sensitivity scores to the data elements based on the content of the data elements and pertinent contextual information.

Further training and testing of the data masking model(s) 440 can be performed, even after the data masking model(s) are deployed. Accordingly, the accuracy of the data masking model(s) can be increased over time. Moreover, contextual information, and thus identified contextual parameters, can evolve over time. Because the data masking model(s) 440 can dynamically determine sensitivity levels (e.g., data sensitivity scores) based, at least in part, on the contextual parameters, the data masking model(s) 440 can adapt to changing security and/or other contextual conditions. For example, an attribute of a data element may be public in nature, but whether the value of that attribute is public or sensitive may change depending on changing security and/or other contextual conditions. Dynamically determining the sensitivity levels for data elements as described herein account can account for the changing security and/or other contextual conditions, and thus properly determine the level of sensitivity for the present security and/or other contextual conditions.

Figure 6:
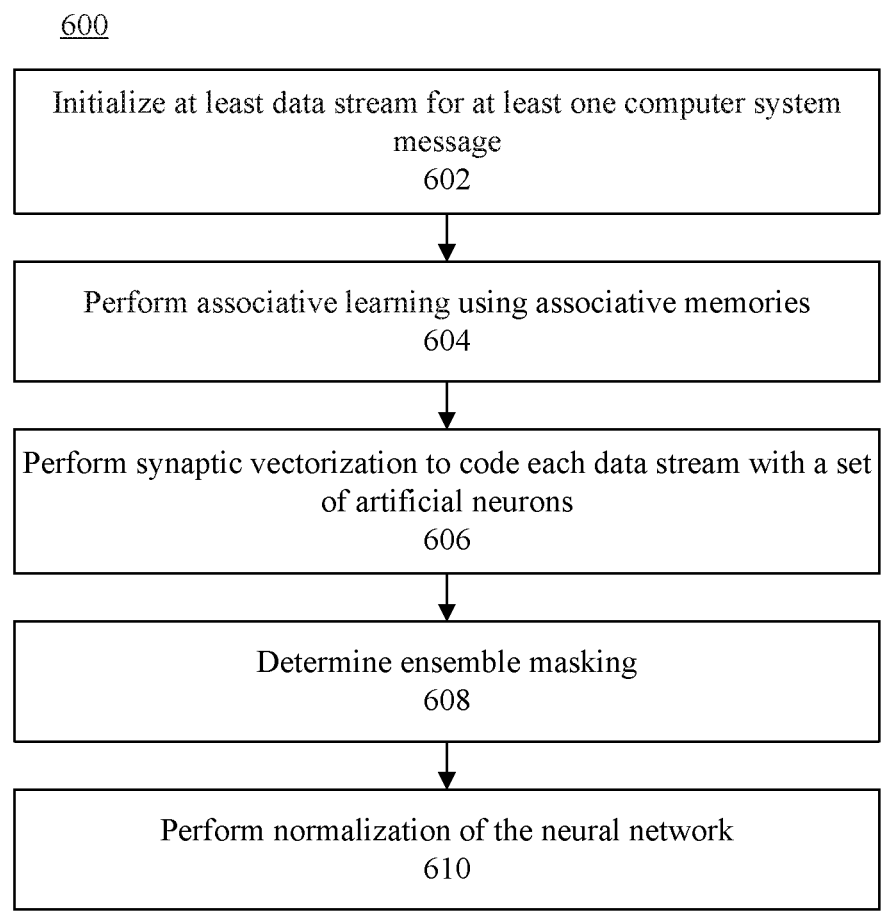
FIG. 6 is a flowchart illustrating an example of a method of training a data masking model for use in applying differential security to a computer system message.

FIG. 6 is a flowchart illustrating an example of a method 600 of training a data masking model 440 for use in applying differential security to a computer system message. The method 600 can be implemented by the CSLCME 430 at step 508 of FIG. 5.

At step 602, the CSLCME 430 can initialize at least one data stream of at least one computer system message (hereinafter "message") 414, which can be a message generated by an API 412 or a message specifically configured for training purposes.

At step 604, the CSLCME 430 can perform associative learning using associative memories. The associative memories can include, for example, the learning data 450 and the knowledge corpus 452. The use of associative memories present advantages in comparison to use of traditional machine learning using memory methods. In traditional methods, the recovery of information is made by arbitrary query patterns. The arrangements described herein, however, use neural network-based models, which results in correct dynamics behaviors when generating outputs.

At step 606, the CSLCME 430 can perform synaptic vectorization to code each data stream with a set of artificial neurons (hereinafter "neurons"). Between neurons, there are connections. Rules for their activation can specify what neurons are activated together and which neurons are connected. Every ensemble of neurons can represent an idea or concept. Appling the rules to the neurons and their connections, context can be added to the bit stream so that it can be securitized in different ways, and selective masking can be achieved.

At step 608, the CSLCME 430 can apply ensemble masking, wherein certain neurons can be included in several ensembles. Accordingly, there is overlap between ensembles. The training process can be represented using the outer product of each ensemble with itself. The description of one situation and its corresponding maneuver is presented as one ensemble.

At step 610, the CSLCME 430 can normalize the neural network. The normalization can include using coding technique to implement information decoding. Further, the neural network is trained with the ensembles that represent different situations and their corresponding maneuvers.

FIG. 7 is a flowchart illustrating an example of a method 700 of applying differential security to a computer system message. The method 700 can be implemented by the system 300 of FIGS. 3 and 4, and performed in real time. In the following description, elements of FIG. 4 will be referenced.

At step 702, the message reader/sender 420 can receive a computer system message (hereinafter "message") 414 generated by an API 412 or addressed to the API 412, for example as described for step 502 of FIG. 5.

At step 704, the context extraction agent(s) 422 can identify, in real time, contextual information that pertains to the data elements contained in the payload of the message 414, for example as described for step 504 of FIG. 5. In illustration, the context extraction agent(s) 422 can identify contextual parameters that pertain to a first of the plurality of data elements, identify contextual parameters that pertain to a second of the plurality of data elements, and so on. Moreover, the context extraction agent(s) 422 can identify contextual parameters that pertain to a group of one or more data elements (e.g., a composite of data elements) contained in the payload of the message 414. Further, in the case that the payload of the message 414 includes media, the context extraction agent(s) 422 can interface with the media-to-text converter 424 to extract contextual parameters contained in media that pertain to various ones and/or composites of the data elements, for example as described for step 504 of FIG. 5. The context extraction agent(s) 422 can communicate the contextual parameters to the cognitive security adapter 426.

At step 706, the cognitive security adapter 426 can determine, in real time, respective data sensitivity scores for the data elements in the payload of the message 414. In illustration, the cognitive security adapter 426 can analyze the data elements by applying one or more data masking models 440 to the data elements, using the contextual parameters and the data elements as inputs to the data masking models 440. The analysis can generate the data sensitivity scores for the data elements and assign the data sensitivity scores to those data elements.

The data sensitivity scores can be based not only on the nature of the data elements, but also can be based on the contextual parameters. For instance, if the message 414 is being communicated to a law enforcement agency and the contextual parameters indicate that the message 414 pertains to a current emergency situation, the data sensitivity scores assigned to certain data elements can be higher than the data sensitivity scores that otherwise be assigned to those data elements at a different time. Further, the data sensitivity scores assigned to various data elements can be different. For example, data elements which represent private information (e.g., social security numbers, driver's license numbers, etc.) can be assigned very high data sensitivity scores, while data elements that represent non-private information (e.g., an address of a public event) can be assigned relatively lower data sensitivity scores.

At step 708, the cognitive security adapter 426 can determine, in real time, whether the data sensitivity scores determined for the data elements warrant masking of any of the data elements. For example, the cognitive security adapter 426 can determine whether any of the data sensitivity scores exceed a threshold value. Referring to decision box 710, if the data sensitivity scores determined for the data elements do not warrant masking of any of the data elements, at step 712 the cognitive security adapter 426 can cause, in real time, the message reader/sender 420 to send the message 414 to the intended recipient without the system 300 applying masking any data elements, for example by communicating a corresponding instruction to the message reader/sender 420.

If, however, the cognitive security adapter 426 determines that at least one of the data sensitivity scores determined for the data elements do warrant masking, at step 714 the cognitive security adapter 426 can cause the SCMH 432 to apply, in real time, differential security to the message 414 based on the data sensitivity scores. For example, the cognitive security adapter 426 can communicating to the SCMH 432 the data sensitivity score assigned each data element. Responsive to receiving the data sensitivity scores, the SCMH 232 can access, in real time, the message 414 from the message reader/sender and apply the differential security to the message 414. Applying the differential security can include selectively masking the data elements in the payload. In illustration, the SCMH 432 can mask data elements which are assigned a data sensitivity score that exceeds the threshold value, and not mask data elements that are assigned a data sensitivity score that does not exceed the threshold value.

At step 716, the message reader/sender 420 can communicate, in real time, the message 414, with the differential security applied, to the destination to which the message is addressed. The data consumers 416 and the systems in the API integration cloud 410 that host the APIs 412 can include, or otherwise access, content decoders that can be used to decode the masked data elements, for example using techniques known in the art. Decoding of the masked data can be implemented using techniques known in the art, for example secret keys (which may be exchanged a priori), code words, substitution of letters and/or digits, using an encoding dictionary, and so on.

Selectively masking the data elements can serve to ensure sensitive data is secured, while improving decoding efficiency of the data consumer computer systems 416 and systems that provide the APIs 412. Specifically, in comparison to an arrangement in which all of the data elements of a payload are masked, selectively masking only a portion of the data elements results in less data decoding that must be performed by the recipient of the message in order to access the data.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving a computer system message generated by an application programming interface (API) or addressed to the API;
determining a first data sensitivity score for at least a first of a plurality of data elements in a payload of the computer system message, wherein the determining the first data sensitivity score comprises identifying first contextual information pertaining to the first of the plurality of data elements in the payload of the computer system message and determining the first data sensitivity score based, at least in part, on the first contextual information, and determining at least second data sensitivity score for at least a second of the plurality of data elements in the payload of the computer system message, wherein the determining the second data sensitivity score comprises identifying second contextual information pertaining to at least the second of the plurality of data elements in the payload of the computer system message and determining the first data sensitivity score based, at least in part, on the second contextual information;
based on the first data sensitivity score and at least the second data sensitivity score, applying, using a processor, a differential security to the computer system message, applying the differential security comprising masking the first of the plurality of data elements and not masking the second of the plurality of data elements; and
electronically communicating the computer system message to a destination to which the message is addressed.

2. The method of claim 1, wherein the applying the differential security to the computer system message is responsive to determining that the first data sensitivity score exceeds a threshold value and determining that the second data sensitivity score does not exceed the threshold value.

3. The method of claim 1, wherein the determining the first data sensitivity score and the determining the second data sensitivity score comprises applying at least one data masking model to the plurality of data elements in the payload of the computer system message using the plurality of data elements, the first contextual information and the second contextual information as inputs to the at least one data masking model.

4. The method of claim 3, further comprising:
training the at least one data masking model using situation-based ensemble masking, the situation-based ensemble masking comprising determining a sensitivity rating for each of a third plurality of data elements of a payload of a second computer system message based on contextual parameters pertaining to the third plurality of data elements.

5. The method of claim 4, further comprising:
mapping the third plurality of data elements and the contextual parameters pertaining to the third plurality of data elements to input features used in the at least one data masking model.

6. The method of claim 5, further comprising:
deriving the input features used in the at least one data masking model from a learning data and a knowledge corpus using artificial intelligence deep learning.

7. A system, comprising:
a processor programmed to initiate executable operations comprising:
receiving a computer system message generated by an application programming interface (API) or addressed to the API;
determining a first data sensitivity score for at least a first of a plurality of data elements in a payload of the computer system message, wherein the determining the first data sensitivity score comprises identifying first contextual information pertaining to the first of the plurality of data elements in the payload of the computer system message and determining the first data sensitivity score based, at least in part, on the first contextual information, and determining at least second data sensitivity score for at least a second of the plurality of data elements in the payload of the computer system message, wherein the determining the second data sensitivity score comprises identifying second contextual information pertaining to at least the second of the plurality of data elements in the payload of the computer system message and determining the first data sensitivity score based, at least in part, on the second contextual information;
based on the first data sensitivity score and at least the second data sensitivity score, applying a differential security to the computer system message, applying the differential security comprising masking the first of the plurality of data elements and not masking the second of the plurality of data elements; and
electronically communicating the computer system message to a destination to which the message is addressed.

8. The system of claim 7, wherein the applying the differential security to the computer system message is responsive to determining that the first data sensitivity score exceeds a threshold value and determining that the second data sensitivity score does not exceed the threshold value.

9. The system of claim 7, wherein the determining the first data sensitivity score and the determining the second data sensitivity score comprises applying at least one data masking model to the plurality of data elements in the payload of the computer system message using the plurality of data elements, the first contextual information and the second contextual information as inputs to the at least one data masking model.

10. The system of claim 9, the executable operations further comprising:
training the at least one data masking model using situation-based ensemble masking, the situation-based ensemble masking comprising determining a sensitivity rating for each of a third plurality of data elements of a payload of a second computer system message based on contextual parameters pertaining to the third plurality of data elements.

11. The system of claim 10, the executable operations further comprising:
mapping the third plurality of data elements and the contextual parameters pertaining to the third plurality of data elements to input features used in the at least one data masking model.

12. The system of claim 11, the executable operations further comprising:
deriving the input features used in the at least one data masking model from a learning data and a knowledge corpus using artificial intelligence deep learning.

13. A computer program product, comprising:
a computer readable storage medium having program code stored thereon, the program code executable by a data processing system to initiate operations including:
receiving a computer system message generated by an application programming interface (API) or addressed to the API;
determining a first data sensitivity score for at least a first of a plurality of data elements in a payload of the computer system message, wherein the determining the first data sensitivity score comprises identifying first contextual information pertaining to the first of the plurality of data elements in the payload of the computer system message and determining the first data sensitivity score based, at least in part, on the first contextual information, and determining at least second data sensitivity score for at least a second of the plurality of data elements in the payload of the computer system message, wherein the determining the second data sensitivity score comprises identifying second contextual information pertaining to at least the second of the plurality of data elements in the payload of the computer system message and determining the first data sensitivity score based, at least in part, on the second contextual information;
based on the first data sensitivity score and at least the second data sensitivity score, applying a differential security to the computer system message, applying the differential security comprising masking the first of the plurality of data elements and not masking the second of the plurality of data elements; and
electronically communicating the computer system message to a destination to which the message is addressed.

14. The computer program product of claim 13, wherein the applying the differential security to the computer system message is responsive to determining that the first data sensitivity score exceeds a threshold value and determining that the second data sensitivity score does not exceed the threshold value.

15. The computer program product of claim 13, wherein the determining the first data sensitivity score and the determining the second data sensitivity score comprises applying at least one data masking model to the plurality of data elements in the payload of the computer system message using the plurality of data elements, the first contextual information and the second contextual information as inputs to the at least one data masking model.

16. The computer program product of claim 15, wherein the program code is executable by the data processing system to initiate operations further comprising:
training the at least one data masking model using situation-based ensemble masking, the situation-based ensemble masking comprising determining a sensitivity rating for each of a third plurality of data elements of a payload of a second computer system message based on contextual parameters pertaining to the third plurality of data elements.

17. The computer program product of claim 16, wherein the program code is executable by the data processing system to initiate operations further comprising:
mapping the third plurality of data elements and the contextual parameters pertaining to the third plurality of data elements to input features used in the at least one data masking model.

* * * * *